United States Patent [19]
Mallwitz et al.

[11] 3,945,600
[45] Mar. 23, 1976

[54] MULTI-DIMENSIONAL APPARATUS FOR MOUNTING LABORATORY AND EXPERIMENTING EQUIPMENT AND/OR FOR ADDITIONALLY MOUNTING OPTICAL ELEMENTS

[75] Inventors: Detlef Mallwitz, Holtensen; Hartmut Klingner; Wolfgang Kubbetat, both of Gottingen, all of Germany

[73] Assignee: Spindler & Hoyer KG Werk fur Feinmechanik und Optik, Gottingen, Germany

[22] Filed: Apr. 9, 1973

[21] Appl. No.: 349,434

[52] U.S. Cl. ............... 248/466; 403/171; 403/177
[51] Int. Cl.² .................................... F16M 13/00
[58] Field of Search ......... 248/466; 211/177; 46/29, 46/31; 403/171, 172, 177

[56] References Cited
UNITED STATES PATENTS

| | | | |
|---|---|---|---|
| 2,461,190 | 2/1949 | Wolff | 248/479 X |
| 2,658,776 | 11/1953 | Wilcox | 46/29 X |
| 2,683,329 | 7/1954 | Kobles | 403/171 X |
| 3,747,890 | 7/1973 | Tubbs | 248/466 |

FOREIGN PATENTS OR APPLICATIONS

| | | | |
|---|---|---|---|
| 647,209 | 10/1962 | Italy | 403/177 |
| 195,888 | 10/1964 | Sweden | 211/177 |
| 1,278,310 | 10/1961 | France | 46/29 |
| 265,873 | 3/1950 | Switzerland | 46/29 |

OTHER PUBLICATIONS

"Instrument Components for Constructing Electro-Optical Systems;" Laser Focus, May, 1968, p. 39.

*Primary Examiner*—William H. Schultz
*Attorney, Agent, or Firm*—Roland I. Griffin

[57] ABSTRACT

A set of connecting elements and mounting elements are provided with split openings and clamping means arranged selected distances apart and at selected orientations so that these elements may be attached to rods to form a multidimensional frame for mounting laboratory and experimenting equipment. Adjustable mounting devices are provided with three point supports centrally arranged on the mounting elements adjacent to apertures therein so that optical elements and other such devices may be supported on the mounting elements and so that the axes of such devices may be tipped or displaced as required for a particular situation.

11 Claims, 11 Drawing Figures

MULTI-DIMENSIONAL APPARATUS FOR MOUNTING LABORATORY AND EXPERIMENTING EQUIPMENT AND/OR FOR ADDITIONALLY MOUNTING OPTICAL ELEMENTS

Background and Summary of the Invention

The present invention relates to a multi-dimensional apparatus having rods and having connecting elements and mounting elements that can be placed and fixed between the rods for mounting laboratory and experimenting equipment and/or for additionally mounting optical elements. The connecting elements and mounting elements have split openings in conjunction with clamping means. Apparatus of this type is preferably employed in research. It permits an experimenting frame to be constructed and can be employed in both the physics/chemical and optical fields. The first field of application requires an apparatus which must be especially stable and variable without increased accuracy requirements being necessary. However, if optical elements are employed, special demands are placed, for example, on the accuracy of a path of rays, whereby, of course, the stability and rigidity of the frame are also important. It is often necessary to combine physics/chemical elements and optical elements in one and the same experimenting frame.

A purely optical system is known from German Utility Pat. No. 7,012,258. That system operates with a number of support rails of differing design, which, in a manner similar to known optical benches, have a number of clamping surfaces machined with high precision. Rails of this type are connected with one another by means of a wide variety of clamping pieces, which are extremely expensive as a result of their high accuracy. Such a system cannot logically be employed for a laboratory frame in which a lesser degree of accuracy is entirely sufficient. Moreover, such a system works with connecting elements which are placed on supports and are equipped for mounting optical elements provided with a pin. The adjustability of the optical elements is not advanced by this measure, as has been known for some time.

Also known is a micro-optical bench, which is employed exclusively for optical purposes. The micro-optical bench has rods, connecting elements, and mounting elements, which, however, are machined with a high degree of precision. The accuracy with which they are machined extends to the area of quality fits and tolerances. A micro-optical bench of this type permits, for example, the parallel displacement of lenses or similar items with no readjustment being necessary. It is obvious that the fabrication of the elements for micro-optical benches is correspondingly expensive and difficult. The individual components of the micro-optical bench are therefore not employed for simple physics laboratory frames, since no demands are placed on the precision machining of the parts in that case.

Also known is a modular-design laboratory frame which also works with rods and connecting elements. Here, too, the rods and connecting elements are machined precisely, so that the modular frame is employed exclusively for optical purposes. The connecting elements are designed for the employment of pins, as used in known optical elements. The adjustability and setting accuracy of the optical elements thus also depends on the condition of the rods and the connecting elements.

The object of the present invention is to avoid the disadvantages of the known state of the art and to create a multi-dimensional apparatus of the type described at the outset which can be universally employed in a logical manner. The apparatus should be equally well suited for realizing a physics/chemical experimenting frame and for permitting the installation of optical elements and/or systems. In addition, the disadvantages inherent in the known "on pin" design are to be avoided.

The apparatus according to the present invention is characterized in that the mounting elements have split openings in conjunction with clamping means for fixing the mounting elements to the rods; in that the connecting elements, the rods, and the mounting elements are components fabricated without precision machining to tolerance; and in that the mounting elements have adjustable mounting devices for tipping and for displacing the axes of optical elements or mechanical components or devices.

The apparatus according to the present invention provides a number of advantages over the state of the art. It is equally well suited for constructing experimenting arrangements for either the highest or less stringent accuracy. The reason for this is that the rods can, for example, be of drawn material, which is employed without any subsequent machining. It is evident that this material guarantees the required stability and rigidity of the apparatus. Moreover, the split openings in the connecting and mounting elements do not require high accuracy as is common with optical elements.

The basis of the invention is to separate the supporting function on the one hand and the guidance and setting function on the other. The connecting elements, the rods, and the mounting elements are components which are fabricated by means of normal machining, i.e. they do not require precision machining to high tolerance. The rods and the connecting elements have only a supporting function. The mounting elements also have a supporting function. The guidance and setting function is handled by the mounting elements, which have only adjustable mounting devices for tipping and displacing the axes of optical elements. This permits only the optical elements to be adjusted so that the rod frame is not employed for adjusting purposes. Through the arrangement of the mounting devices for tipping and displacing the axes of the optical elements on the mounting elements, every optical system can be centered immediately. This applies to those mounting devices which are provided for the employment of optical elements.

The apparatus of the present invention also comprises other mounting elements which are employed for the arrangement of physical elements, e.g. for holding a cup, a stirrer, etc. In this case, precise setting accuracy is not required. For this reason, these mounting elements have only mechanical components or devices for attachment of the elements (cups, stirrers, etc.) to be held.

A further advantage of the apparatus of the present invention is that optical benches, micro-optical benches, or other optical elements can be readily inserted in the apparatus and attached thereto. The small number of parts employed simplifies the applicability of the apparatus. It nevertheless provides all possibilities which can be realized with comparatively expensive optical laboratory systems. It must further be taken into consideration that the fabrication of the elements is greatly simplified, as precise tolerances are no longer required. However, this inexpensive system also permits precise demands to be satisfied. A further advantage is that the subsequent installation of elements in an existing laboratory frame is possible without extensive disassembly. Other advantages of the invention will be explained below in connection with the detailed description of the illustrated embodiments.

It is especially advantageous for each adjustable mounting device to have at least one three-point support. Preferably, however, only two three-point supports are provided, one designed for tipping and the other for displacing the axis of an optical element. Each mounting device is arranged centrally on a corresponding mounting element so that, for example, lenses of differing diameter can be immediately centered if the mounting element first put in place was centered at all.

The apparatus of the present invention is preferably constructed in a square system. For this purpose, the mounting elements have four openings arranged in a square. It is obvious that a triangular or hexagonal system is also possible. The apparatus also includes further mounting elements which only have two openings, however, and whose corners opposite the openings are canted. These elements are preferably employed for subsequent insertion, as they can be effortlessly swivelled in place between the rods of the frame and fixed there without disassembly.

The apparatus of the present invention differentiates between pure connecting elements and so-called mounting elements. The connecting elements are employed in the experimenting frame primarily for clamping and stabilizing purposes, while the mounting elements are for the employment of experimenting components or devices or, in particular, of optical elements. Connecting elements for forming corner connections are also provided. Each of these connecting elements has two intersecting openings and is split or separated into two sections at a common central plane. Mounting elements are also provided which have at least two intersecting openings and are preferably employed for pin mounting of equipment and other stand material. Special connecting elements for forming corners are designed for connection to at least one mounting element. Each of these special connecting elements has two parallel holes and one hole rotated 90° relative to the axis of symmetry of the two parallel holes.

The above discussed and other objects, features, and advantages of the present invention will become more apparent from the following description, when taken in connection with the accompanying drawings.

Description of the Preferred Embodiments

Figure 1:
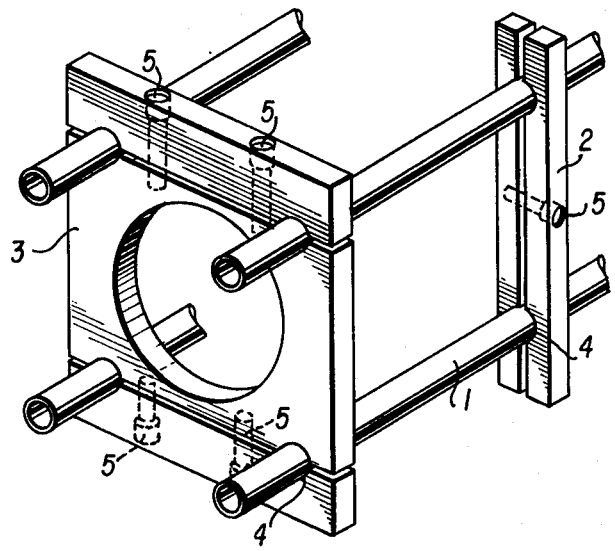
FIG. 1 is a perspective view of the major elements of apparatus according to the preferred embodiment of this invention.

Referring now to the drawings, FIG. 1 schematically illustrates the major components of apparatus according to the preferred embodiment of this invention, namely rods 1, connecting elements 2, and mounting elements 3. The rods 1 are of drawn material in raw form. Precise machining of these rods 1 is not necessary. Connecting elements 2 and mounting elements 3 have split openings 4, which are designed as holes in the illustrated embodiments. As can be seen, the openings 4 are split to permit the individual members of the connecting elements 2 and of the mounting elements 3 to be placed around the rods 1 without requiring the connecting elements 2 or mounting elements 3 to be slid onto the rods. If, for example, unsplit openings, which are known, were used, the connecting elements 2 and the mounting elements 3 could only be pushed onto the rods 1. This would have a hindering effect, particularly if an element were to be subsequently installed.

The connecting elements 2 and the mounting elements 3 have clamping means 5, which, as illustrated below, are realized by means of threaded holes in conjunction with corresponding screws. It should be mentioned that with these clamping means 5, the entire surfaces of the openings 4 of the connecting elements 2 and the mounting elements 3 act on the rods 1, thereby avoiding point strains such as are caused, for example, by set screws.

As can be seen, the apparatus illustrated schematically in FIG. 1 is based on a square system. However, it is equally possible to employ a triangular or hexagonal system and to apply the idea of the invention thereto.

Figure 2:
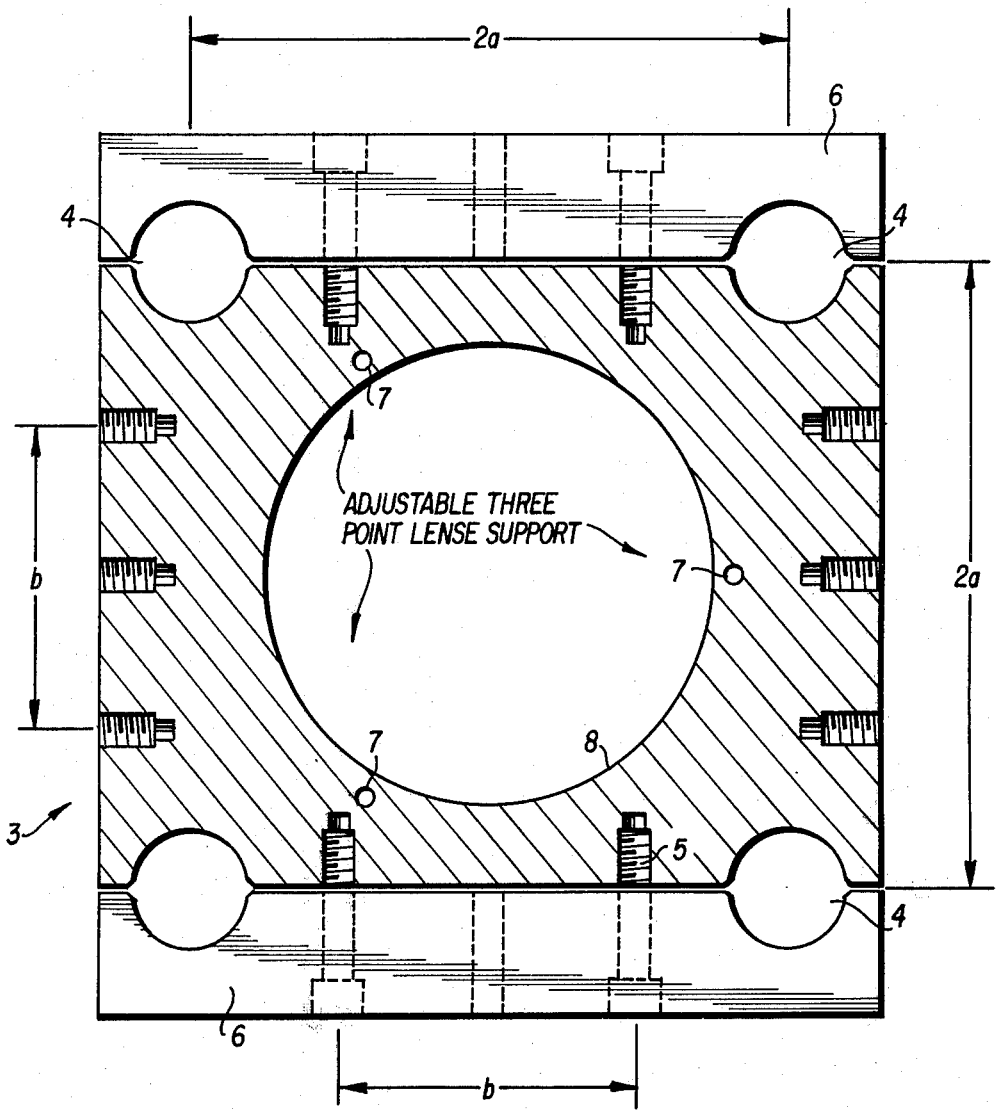
FIG. 2 is a partially cut away top view of the mounting element of FIG. 1.
Figure 3:
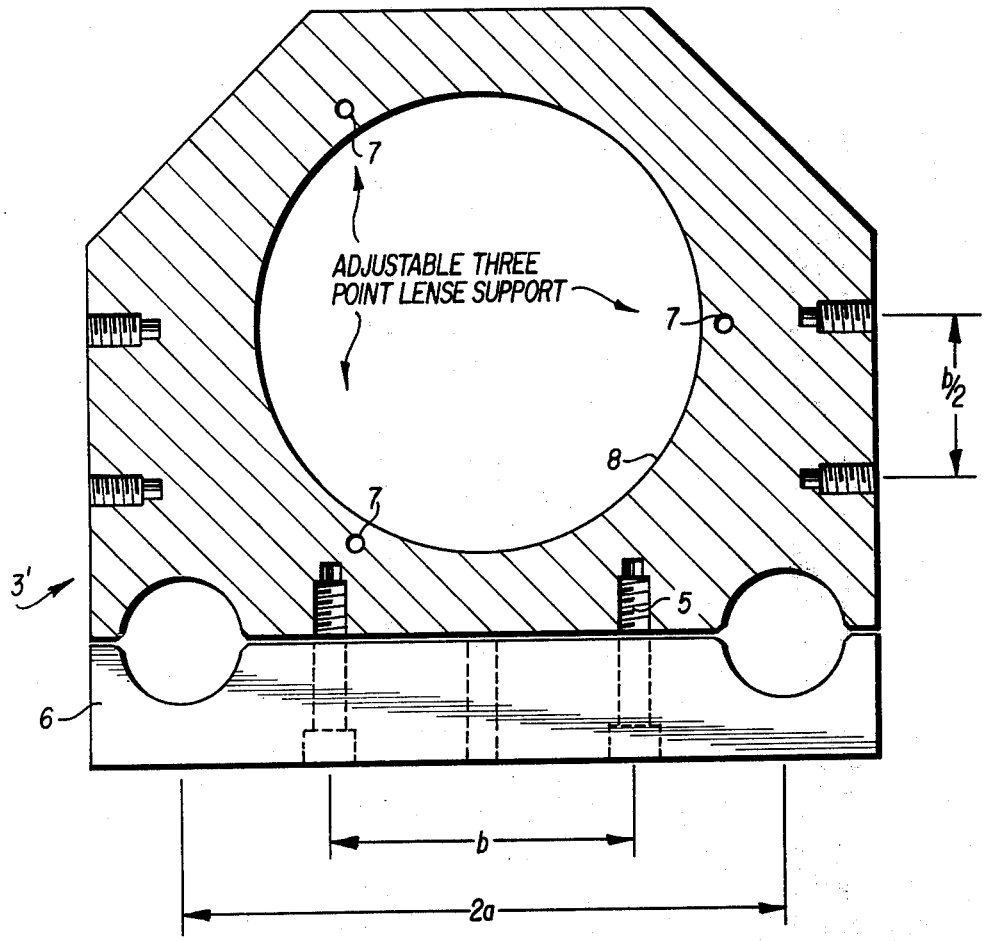
FIG. 3 is a partially cut away top view of a modified form of the mounting element of FIG. 2.

FIGS. 2 and 3 illustrate two embodiments of the mounting element, 3 and 3', respectively. Each of the mounting elements 3 and 3' comprises a plate having the depth of a connecting element. This plate has openings 4 in a square arrangement. Each of these openings 4 is designed as a split opening. The mounting element 3 therefore has two bridges 6 associated with it. All the openings 4 and the bridges 6 are manufactured with comparatively low accuracy since they are employed exclusively for clamping, i.e. for the construction of the frame itself, but not for adjusting any optical elements. The openings 4 have a given, defined center-to-center distance $2a$, which can be 100 mm, for example. The clamping means 5, which are provided in the form of holes and threaded holes in the mounting elements 3 and 3', preferably have the arrangements illustrated in FIGS. 2 and 3. A threaded hole is located along the illustrated vertical axis of symmetry, while two additional holes are arranged in such a manner that they are staggered symmetrically relative to the threaded hole and spaced from one another by a distance $b$, which can be 50 mm, for example.

Each of the mounting elements 3 and 3' has concentrically positioned at its center a mounting device comprising at least one three-point support 7 in conjunction with an aperture 8. Such three point support mounting devices are commercially available and are shown and described, for example, in British Pat. No. 655,856 (see FIGS. 1 and 5–7), in Gaertner Optical Instrumentation Bulletin 156–68 (see pages 1 and 15), and in the 1968/1969 catalog of the Ealing Corporation of Cambridge, Massachusetts (see page 73). The mounting device 7 and 8 serves, for example, to mount optical elements such as lenses, filters, etc. on the mounting element 3 or 3'. The mounting element 3 is connected with the rods 1 in the manner illustrated in FIG. 1, whereby it can also be subsequently installed between other mounting elements. Depending on the distance to the neighboring mounting element 3 or a connecting element 2, it is merely necessary to loosen the clamping means 5 slightly to permit the mounting element 3 to be swivelled in place between four rods 1. Bending the rods 1 apart slightly is not harmful. In any event, it is not necessary to completely remove neighboring elements 3 from the apparatus. If, on the other hand, it is not desirable for the rods 1 to be bent, or if this is not possible for any reason, the mounting element 3' is preferably employed. Because of its canted corners, the mounting element 3' can be readily swivelled into a module field formed by a plurality of rods 1. In every case, the mounting device 7 and 8 is arranged on the mounting element 3 or 3' in the center of the module field, thereby permitting coarse adjustment. The actual (fine) adjustment is accomplished by means of the three-point support 7 for tipping and/or another unillustrated three-point support for displacing the axes of the optical elements. The nature of the mounting elements 3 and 3' is such that the clamping means for the frame are separate from the adjustment of any optical elements. This very significantly simplifies fabrication of the mounting elements 3 and 3'. Moreover, however, with the aid of these relatively simple and inexpensively fabricated elements, it is possible to create a test frame of the type necessary to meet the highest demands in the field of optics.

Figure 4:
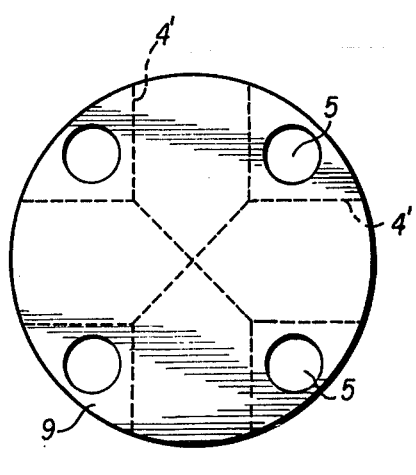
FIG. 4 is a top view of a connecting element for forming corner connections.
Figure 5:
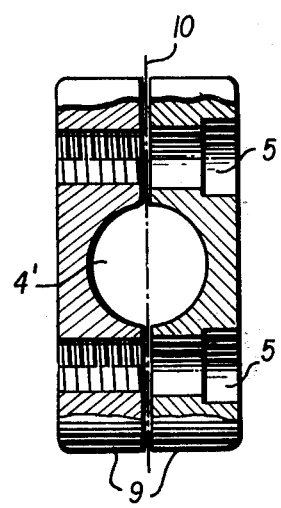
FIG. 5 is a partially cut away side view of the connecting element of FIG. 4.

FIGS. 4 and 5 illustrate a special connecting element 9 for forming corner connections. Connecting element 9 comprises, for example, two circularly defined plates separated at their common central plane and provided with two intersecting openings 4'. Clamping means 5 connect the two sections of the connecting element 9. As can be seen, connecting elements 9 not only permit attachment of a right-angled corner connection, but also of a corner connection having an acute or obtuse angle (this is accomplished, for example, by employing two connecting elements 9, one behind the other).

Figure 6:
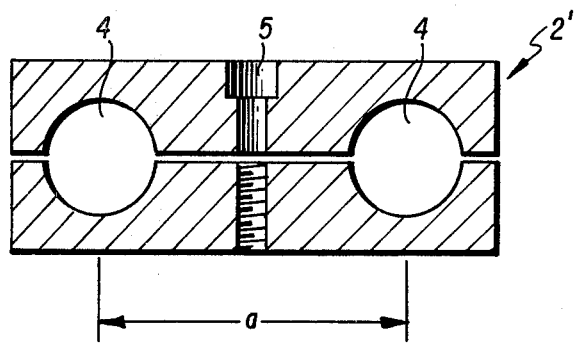
FIG. 6 is a sectional side view of another connecting element.

FIG. 6 illustrates a connecting element 2'. This connecting element 2' has two sections and two openings 4 placed through the common central plane between those sections. In this case, the center-to-center distance between the openings 4 is a, while the center-to-center distance between the openings 4 in the connecting element 2 of FIG. 1 is 2a. Connecting element 2' therefore permits further construction at half the distance of the rods 1 illustrated in FIG. 1. In particular, this provides the possibility of achieving a central ray path in the module field construction.

Figure 7:
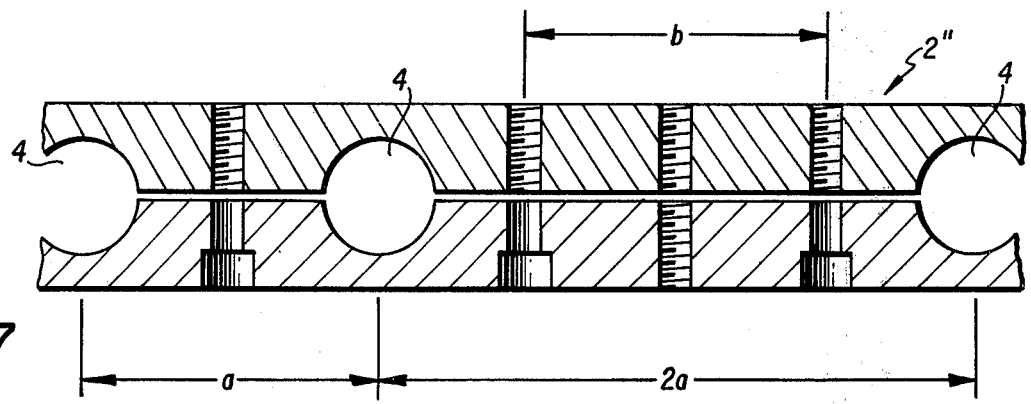
FIG. 7 is a sectional side view of a further connecting element.
Figure 8:
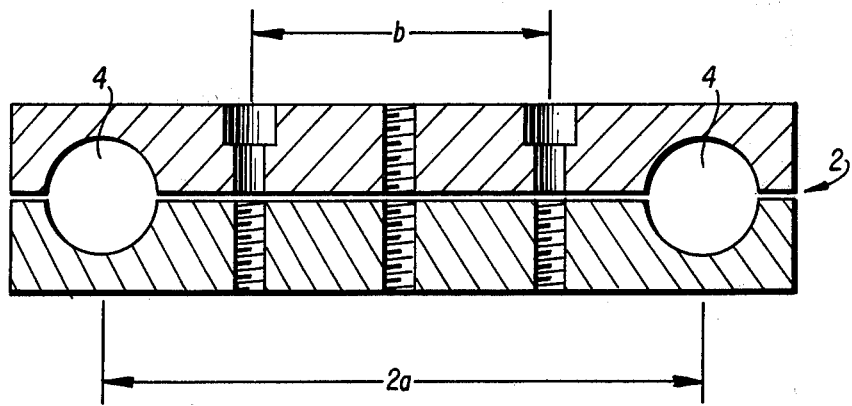
FIG. 8 is a sectional side view of a connecting element like that of FIG. 1.

FIG. 7 illustrates a connecting element 2'' having a total of three openings 4, two of which are separated by the center-to-center distance a and two of which are separated by the center-to-center distance 2a. This also provides various possibilities for frame construction. FIG. 8 illustrates the connecting element 2 in which the center-to-center distance between the openings 4 is 2a.

Figure 9:
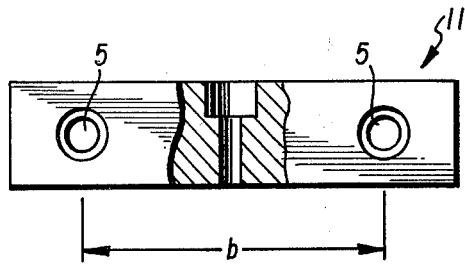
FIG. 9 is a partially cut away top view of another connecting element for forming corner connections.

In the illustrated connecting elements, the clamping means 5 are arranged in a logical manner. In this regard, the distance b, which coincides with the distance b on the mounting elements 3 and 3', is of significance. The two symmetrically arranged holes separated by the distance b are employed for clamping the connecting element. The remaining hole is for the further construction of the experimenting arrangement. For example, by employing two mounting elements 3 a corner connection can be created with the connecting element 11 illustrated in FIG. 9, whereby the mounting elements 3 are arranged relative to one another at an angle of 90°. The connecting element 11 is bolted to one mounting element by means of the central hole and attached to the other mounting element by means of the two symmetrically arranged holes 5.

Figure 10:
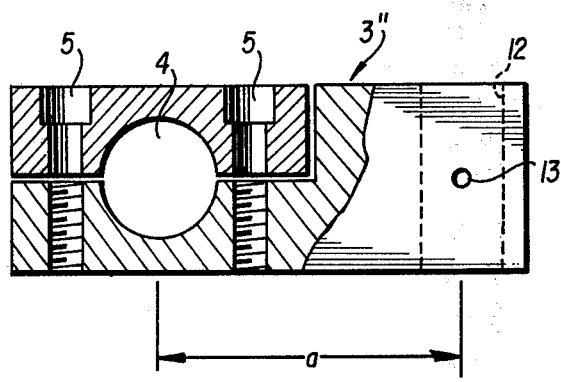
FIG. 10 is a partially cut away side view of a special embodiment of a mounting element.
Figure 11:
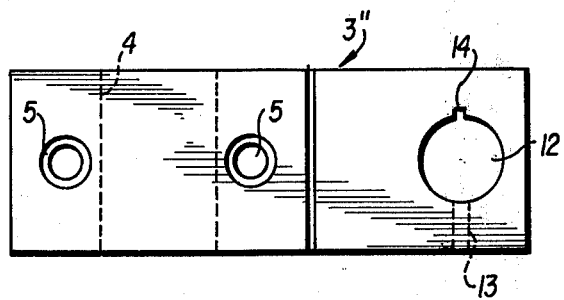
FIG. 11 is a top view of the mounting element of FIG. 10.

FIGS. 10 and 11 illustrate a mounting element 3'' having an opening 4 in conjunction with clamping means 5. A hole 12 is displaced a distance a from the opening 4 and rotated 90° for holding a pin attached to optical elements which are present. This pin is firmly clamped to the edges of the groove 14 with the aid of a setscrew which can be inserted in the threaded hole 13. Thus, mounting element 3'' permits known optical elements which are equipped with pins to be employed within the present apparatus. The center-to-center distance a of the hole 12 from the opening 4 permits the central arrangement of an optical element in the indicated module field.

Obviously, many modifications and variations of the present invention are possible in the light of the above teachings. It should therefore be understood that within the scope of the appended claims, the invention may be practiced otherwise than as specifically described.

We claim:

1. A multi-dimensional apparatus for mounting optical and other components, said apparatus comprising a plurality of rods, a plurality of connecting elements having split openings for receiving the rods and having clamping means for releasably fixedly engaging the connecting elements with the rods received by the split openings of the connecting elements, and a plurality of mounting elements also having split openings for receiving the rods and also having clamping means for releasably fixedly engaging the mounting elements with the rods received by the split openings of the mounting elements, each of said mounting elements further having an adjustable mounting device for mounting an optical or other component on the mounting element and for adjusting the axis of that component while the mounting element is fixedly engaged with the rods.

2. A multi-dimensional apparatus as in claim 1 wherein the split openings of at least some of said connecting and mounting elements are arranged at a given distance or at a whole multiple thereof from one another.

3. A multi-dimensional apparatus as in claim 1 wherein the adjustable mounting device of each of said mounting elements has at least one three-point support.

4. A multi-dimensional apparatus as in claim 1 wherein the adjustable mounting device of each of said mounting elements is arranged centrally on its mounting element.

5. A multi-dimensional apparatus as in claim 1 wherein at least some of said mounting elements have four split openings arranged in a square along opposite sides of those mounting elements.

6. A multi-dimensional apparatus as in claim 1 wherein at least some of said mounting elements have two split openings arranged along one side of those mounting elements and two canted corners arranged along another side of those mounting elements opposite those two split openings.

7. A multi-dimensional apparatus as in claim 1 wherein at least some of said connecting elements have two intersecting split openings for forming a corner connection and have two sections separated at a common central plane passing through those two split openings.

8. A multi-dimensional apparatus as in claim 1 wherein at least some of said mounting elements have at least two split openings spaced from and oriented at right angles to one another.

9. A multi-dimensional apparatus as in claim 1 including at least some connecting elements having two parallel holes and one hole rotated 90° relative to those two holes and located along an axis of symmetry of the connecting element, said holes being arranged for forming corner connections in conjunction with at least one of said mounting or connecting elements.

10. A multi-dimensional apparatus as in claim 1 wherein the split openings of at least some of said mounting and connecting elements are arranged at a given distance or at a whole multiple thereof from one another, and the adjustable mounting device of each of said mounting elements has at least one three-point support arranged centrally on its mounting element and positioned adjacent to an opening therein.

11. A multi-dimensional apparatus as in claim 1 wherein the adjustable mounting device of each of said mounting elements has at least one three-point support positioned adjacent to an associated opening in its mounting element.

* * * * *